United States Patent
Sasaki et al.

(10) Patent No.: US 7,950,623 B2
(45) Date of Patent: May 31, 2011

(54) VALVE OPENING AND CLOSING CONTROL APPARATUS

(75) Inventors: Kazushi Sasaki, Nagoya (JP); Osamu Shimane, Kariya (JP)

(73) Assignee: Denso Corporation, Kariya (JP)

( * ) Notice: Subject to any disclaimer, the term of this patent is extended or adjusted under 35 U.S.C. 154(b) by 519 days.

(21) Appl. No.: 12/197,520

(22) Filed: Aug. 25, 2008

(65) Prior Publication Data
US 2009/0078898 A1    Mar. 26, 2009

(30) Foreign Application Priority Data
Sep. 20, 2007    (JP) ................. 2007-243259

(51) Int. Cl.
*F16K 31/02* (2006.01)
(52) U.S. Cl. .................. 251/129.04; 251/305
(58) Field of Classification Search ............. 251/129.01, 251/129.04, 304, 305
See application file for complete search history.

(56) References Cited

U.S. PATENT DOCUMENTS

| | | | | |
|---|---|---|---|---|
| 4,625,943 A | * | 12/1986 | Groger | 251/305 |
| 4,880,207 A | * | 11/1989 | Matsumoto et al. | 251/337 |
| 5,492,097 A | * | 2/1996 | Byram et al. | 123/396 |
| 5,685,521 A | * | 11/1997 | Yoshida et al. | 251/313 |
| 5,762,044 A | * | 6/1998 | Hollister et al. | 123/400 |
| 6,622,984 B2 | * | 9/2003 | Rauch et al. | 251/71 |
| 7,168,682 B2 | | 1/2007 | Nanba et al. | |
| 7,234,444 B2 | | 6/2007 | Nanba et al. | |

FOREIGN PATENT DOCUMENTS

JP    2003-314377    11/2003

* cited by examiner

*Primary Examiner* — John K Fristoe, Jr.
(74) *Attorney, Agent, or Firm* — Nixon & Vanderhye PC

(57) ABSTRACT

When a control unit variably controls an electric power supplied to an electric motor to repeat a valve opening and closing movement of a valve between a first intermediate position and a second intermediate position through a neutral position, the control unit initially sets the neutral position as a control target value until a valve position, which is sensed with a valve opening degree sensor, is located immediately before the neutral position. The control unit thereafter changes the control target value to the first intermediate position or the second intermediate position when the control unit determines that the valve position, which is sensed with the valve opening degree sensor, reaches the neutral position.

6 Claims, 7 Drawing Sheets

VALVE OPENING AND CLOSING CONTROL APPARATUS

CROSS REFERENCE TO RELATED APPLICATION

This application is based on and incorporates herein by reference Japanese Patent Application No. 2007-243259 filed on Sep. 20, 2007.

BACKGROUND OF THE INVENTION

1. Field of the Invention

The present invention relates to a valve opening and closing control apparatus, which drives a valve.

2. Description of Related Art

In order to reduce noxious components (e.g., nitrogen oxide also called as NOx) contained in the exhaust gas outputted from each combustion chamber of the internal combustion engine (e.g., a diesel engine), an exhaust gas recirculation apparatus, which includes an exhaust gas recirculation pipe and an EGR control valve, has been proposed (see, for example, Japanese Unexamined Patent Publication No. 2005-233063). The exhaust gas recirculation pipe recirculates a portion of the exhaust gas, which is outputted from each combustion chamber of the internal combustion engine, into an intake system of the internal combustion engine. The EGR control valve variably controls a recirculation quantity of the EGR gas (an EGR quantity) flowing in the exhaust gas recirculation pipe.

As shown in FIG. 6, the EGR control valve, which is installed in the exhaust gas recirculation apparatus, includes a housing 101, a nozzle 103, a butterfly valve 105, a valve shaft 106 and an actuator. The housing 101 forms a portion of the exhaust gas recirculation pipe. The nozzle 103 is fitted into and is supported by a cylindrical portion 102 of the housing 101. The butterfly valve 105 is received in an interior (an exhaust gas passage 104) of the nozzle 103 such that the butterfly valve 105 can be opened and closed therein. The valve shaft 106 supports the butterfly valve 105. The actuator drives the butterfly valve 105 through the valve shaft 106 to execute the valve opening movement and the valve closing movement of the butterfly valve 105.

A single coil spring, in which a first spring 111 and a second spring 112 are integrated together, is provided as a valve urging means of the EGR control valve. The first spring 111 applies a spring load to the butterfly valve 105 in the valve closing direction, and the second spring 112 applies a spring load to the butterfly valve 105 in the valve opening direction. One end portion of the first spring 111 and the other end portion of the second spring 112 are wound in opposite directions, respectively.

The actuator includes an electric motor (serving as a drive source) 107 and a speed reducing gear mechanism. The speed reducing gear mechanism reduces the rotational speed of a motor shaft 109 in two steps and thereby increases the drive force (the rotational torque) of the motor 107 to drive the valve shaft 106 of the butterfly valve 105. The speed reducing gear mechanism includes first to third gears 121-123.

The first gear 121 is a motor gear, which is fixed to the motor shaft 109 of the motor 107 and is rotated about an axis of the motor shaft 109. The second gear 122 is an intermediate speed reducing gear, which is rotated about an axis of a gear shaft 124, which is securely press fitted into the housing 101. The second gear 122 includes a large diameter gear and a small diameter gear, which are formed integrally. The large diameter gear is meshed with the first gear 121, and the small diameter gear is meshed with the third gear 123. The third gear 123 is a valve gear, which is fixed to the valve shaft 106 of the butterfly valve 105 and is rotated about an axis of the valve shaft 106. In general, a predetermined gap (backlash) is required between opposed tooth surfaces of adjacent gears to enable smooth movement of the gears.

The exhaust gas, which is outputted from each combustion chamber of the internal combustion engine, contains fine particulate impurities (exhaust fine particles, particulate matter), such as combustion residues or carbon particles. Thus, a deposit (attachment or sediment) of the particulate impurities contained in the exhaust gas may possibly be attached or accumulated in the interior of the EGR control valve during the operation of the internal combustion engine.

In the case where the deposit is adhered or accumulated around the valve of the EGR control valve, when a viscosity of the deposit becomes relatively high upon dropping of the temperature of the deposit after engine stop, valve sticking (sticking of the valve caused by the viscous deposit) may possible occur due to the solidification of the deposit.

In the case of the EGR control valve recited in Japanese Unexamined Patent Publication No. 2005-233063 (corresponding to U.S. Pat. No. 7,234,444), in order to limit the sticking of the butterfly valve 105 caused by the accumulation and solidification of the deposit, the butterfly valve 105 is driven by the drive force of the motor 107 to execute the opening and closing movement of the butterfly valve 105 over the valve full close position at least once and is then stopped at the valve stop position after passing the valve full position. In this way, the deposit, which is adhered or accumulated around the valve 105, is scraped from a passage wall surface of the nozzle 103 around the valve full close position.

Furthermore, there is also known an EGR control valve, in which the butterfly valve 105 is driven to execute the opening and closing movement of the butterfly valve 105 at least once within a predetermined range, which extends from a location before the valve full close position and a location after the valve full close position, and then the butterfly valve 105 is stopped at the valve full close position, so that the deposit, which is adhered or accumulated on the passage wall surface of the housing 101, is scraped (see, for example, Japanese Unexamined Patent Publication No. 2003-314377).

In the EGR control valves recited in Japanese Unexamined Patent Publication No. 2005-233063 (corresponding to U.S. Pat. No. 7,234,444) and Japanese Unexamined Patent Publication No. 2003-314377, when the butterfly valve 105 is reciprocally moved between the two target positions in the deposit scraping action over the neutral position, at which the spring load of the first spring 111 and the spring load of the second spring 112 are balanced with each other, a relatively large hitting sound (collision sound) is generated due to collision between tooth surfaces of the adjacent gears. This is due to reversing of the direction of the backlash between the tooth surfaces of the first and second gears 121, 122 and reversing of the direction of the backlash between the tooth surfaces of the second and third gears 122, 123 at the time of passing through the neutral position.

Since this hitting sound is the impact sound, the hitting sound may possibly be reduced by reducing the valve moving speed throughout its movement. When the valve moving speed is reduced, the time required for the deposit scraping action is disadvantageously lengthened. Thereby, the time between the turning off of the ignition switch and turning off of a main relay of an engine control unit (ECU) is lengthened. Thereby, a risk in terms of a vehicle burglar security is disadvantageously increased in a vehicle having a burglarproof security system.

In the deposit scraping action, when the movement of the butterfly valve 105 is set such that the butterfly valve 105 does not move over the neutral position, the hitting sound, which is caused by the collision between the tooth surfaces of the gears, is not generated. However, in such a case, the valve stop position at the time of stopping the power supply to the motor 107 is deviated from the valve full close position. Therefore, the butterfly valve 105 is placed in the open state. Thereby, at the time of failure of the EGR control valve, i.e., at the time of failure of the motor 107, the EGR gas is always recirculated into the intake system of the internal combustion engine. Thus, the EGR quantity may possibly become excessive relative to the intake air quantity. When the EGR quantity becomes excessive relative to the intake air quantity, a misfire of the internal combustion engine may occur. This may lead to an engine stall, and thereby the vehicle may not be driven.

SUMMARY OF THE INVENTION

The present invention is made in view of the above disadvantages. Thus, it is an objective of the present invention to provide a valve opening and closing control apparatus, which can limit generation of a hitting sound caused by collision between tooth surfaces of adjacent gears at the time of executing a deposit scraping action.

To achieve the objective of the present invention, there is provided a valve opening and closing control apparatus, which includes a fluid control valve device, an actuator, a first valve urging means, a second valve urging means, a valve position sensing means and a control unit. The fluid control valve device includes a housing and a valve. The housing forms a fluid passage communicated with a combustion chamber of an internal combustion engine. The valve is received in the fluid passage in an openable and closable manner. The actuator includes an electric motor and a plurality of gears. The electric motor generates a drive force to drive the valve in a valve opening direction or a valve closing direction. The plurality of gears transmits the drive force of the electric motor to the valve. The first valve urging means is for urging the valve in the valve closing direction. The second valve urging means is for urging the valve in the valve opening direction. The valve position sensing means is for sensing a current position of the valve. The control unit variably controls an electric power supplied to the electric motor in such a manner that a valve position, which is sensed with the valve position sensing means, coincides with a control target value of the valve. The control unit variably controls the electric power supplied to the electric motor in such a manner that the valve repeats an opening and closing movement within a predetermined valve opening degree range between a first intermediate position and a second intermediate position through a neutral position. The neutral position is located at or adjacent to a full close position, at which the valve is fully closed to close the fluid passage. An urging force of the first valve urging means is balanced with an urging force of the second valve urging means at the neutral position. The first intermediate position is displaced from the neutral position in the valve opening direction. The second intermediate position is displaced from the neutral position in the valve closing direction. When the control unit variably controls the electric power supplied to the electric motor to repeat the valve opening and closing movement of the valve, the control unit initially sets one of the neutral position and a position adjacent to the neutral position as the control target value is until the valve position, which is sensed with the valve position sensing means, is located immediately before the one of the neutral position and the position adjacent to the neutral position. The control unit thereafter changes the control target value to the first intermediate position or the second intermediate position when the control unit determines that the valve position, which is sensed with the valve position sensing means, reaches the one of the neutral position and the position adjacent to the neutral position.

BRIEF DESCRIPTION OF THE DRAWINGS

The invention, together with additional objectives, features and advantages thereof, will be best understood from the following description, the appended claims and the accompanying drawings in which.

DETAILED DESCRIPTION OF THE INVENTION

Figure 1A:
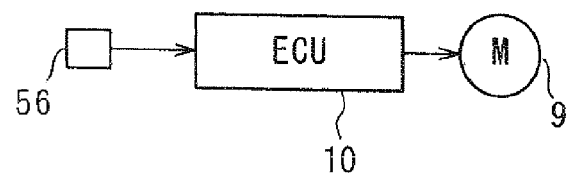
FIG. 1A is a block diagram showing an EGR control apparatus of an internal combustion engine according to an embodiment of the present invention.
Figure 1B:
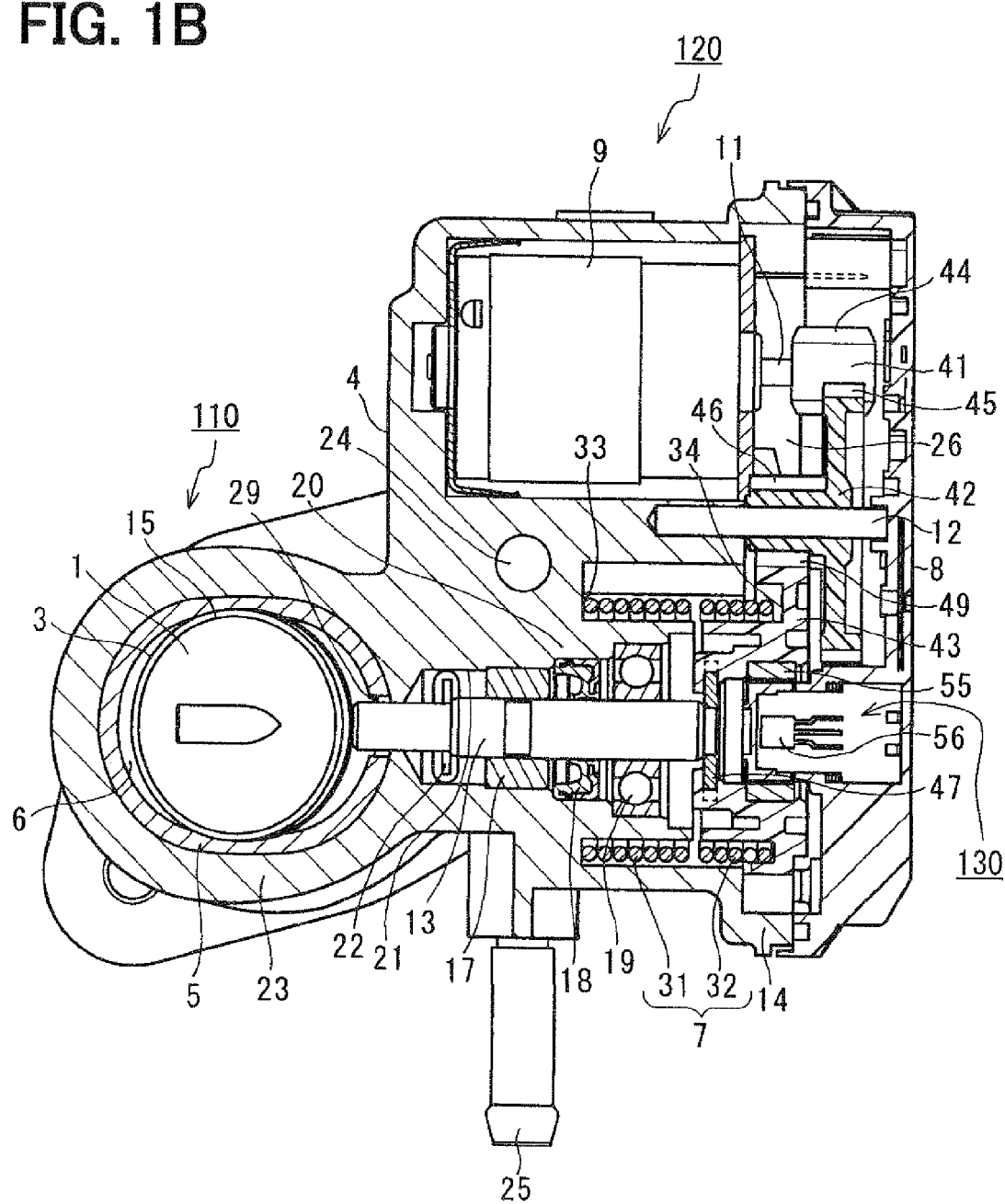
FIG. 1B is a cross sectional view showing an exhaust gas recirculation control valve (EGRV) according to the embodiment.

An embodiment of the present invention will be described with reference to FIGS. 1A to 5.

A control system of an internal combustion engine (hereinafter, simply referred to as an engine) installed in an engine room of a vehicle according to the present embodiment is used as an EGR control system (exhaust gas recirculation control system) of the engine, which controls a recirculation quantity (also referred to as an EGR quantity, an EGR ratio) of exhaust gas (EGR gas) that is recirculated into an intake system from an exhaust system of the engine based on an operational state of the engine.

The EGR control system (a valve opening and closing control apparatus) of the engine according to the present embodiment includes an intake pipe, an exhaust pipe, an exhaust gas recirculation pipe, an exhaust gas recirculation control valve (also referred to as an exhaust gas control valve, an EGR control valve, and will be hereinafter referred to as an EGRV) 110 and a valve opening and closing control device. The intake pipe and the exhaust pipe are communicated with a combustion chamber of each of cylinders of the engine. The exhaust gas recirculation pipe recirculates a portion of the exhaust gas, which is outputted from the combustion chamber of each of the cylinders, from the exhaust system (the exhaust pipe) to the intake system (the intake pipe). The EGRV 110 controls the recirculation quantity of the EGR gas, which flows in the exhaust gas recirculation pipe. The valve opening and closing control device controls opening and closing of a valve element (or simply referred to as a valve, and will be hereinafter referred to as a butterfly valve) 1.

Here, the engine is a direct fuel injection type diesel engine, in which fuel is directly injected into the combustion chamber of each cylinder. Furthermore, the engine may be a diesel engine having a supercharger (an engine having a turbocharger or simply referred to as a turbo-charger engine).

The exhaust gas recirculation apparatus of the present embodiment includes the exhaust gas recirculation pipe and the EGRV 110 described above. The exhaust gas recirculation pipe connects between a branching portion of the exhaust pipe and a merging portion of the intake pipe. The EGRV 110 is placed in the exhaust gas recirculation pipe. In the interior of the exhaust gas recirculation pipe, an exhaust gas recirculation passage communicates between an exhaust passage in the exhaust pipe and an intake passage formed in the intake pipe. The exhaust gas recirculation passage forms a fluid passage, which is communicated with the combustion chamber of each cylinder of the engine.

The EGRV 110 serves as a fluid control valve device of the present invention and includes the butterfly valve (EGR control valve) 1, a seal ring 3, a housing 4 and a nozzle 5. The butterfly valve 1 controls the recirculation quantity of the EGR gas. The seal ring 3 is fitted into a seal ring groove (an annular groove) formed in an outer peripheral surface of the butterfly valve 1. The housing 4 forms a part of the exhaust gas recirculation passage. The nozzle 5 is fitted into a cylindrical portion of the housing 4.

The EGRV 110 forms a fluid flow quantity control valve, which changes an exhaust gas flow cross sectional area of the exhaust gas recirculation passage (the fluid passage) 6, which is formed in the interior of the housing 4 and the nozzle 5, to variably control the EGR quantity mixed into the intake air (the EGR ratio relative to the flesh intake air quantity).

Furthermore, the EGRV 110 hermetically seals between the butterfly valve 1 and the housing 4 through use of a radially outward tension of the seal ring 3, which is received in the seal ring groove of the butterfly valve 1. The housing 4 has the nozzle 5, which receives the butterfly valve 1 therein in a manner that allows opening and closing movement of the butterfly valve 1 (i.e., in an openable and closable manner).

The valve opening and closing control device includes a spring (a valve urging means) 7, a valve drive device (a valve drive means) and an engine control unit (also referred to as a motor control means or a motor control unit, and will be hereinafter referred to as an ECU) 10. The spring 7 urges the butterfly valve 1 toward a full close position. The valve drive device includes an electric motor 9 as a drive source and drives the butterfly valve 1 in a valve closing direction and a valve opening direction. The ECU 10 controls a valve opening degree (a valve position, an EGRV opening degree) of the butterfly valve 1 by changing the electric power supplied to the motor 9.

The EGRV 110 of the present embodiment is placed in the exhaust gas recirculation pipe of the exhaust gas recirculation apparatus. Alternatively, the EGRV 110 may be placed in the branching portion, at which the exhaust gas recirculation pipe is branched from the exhaust pipe. Further alternatively, the EGRV 110 may be placed in the merging portion, at which the exhaust gas recirculation pipe merges to the intake pipe.

Here, a gear housing 14 is formed integrally at an outer wall portion of the housing 4. A motor shaft 11, an intermediate shaft 12 and a valve shaft 13 are placed parallel to each other in the gear housing 14. The motor shaft 11 is a shaft of the motor 9. The intermediate shaft 12 is an intermediate speed reducing gear shaft that extends in the axial direction. The valve shaft 13 is a shaft of the butterfly valve 1.

The butterfly valve 1 of the present embodiment is made of a heat resistant material (e.g., stainless steel) and is configured into a generally circular plate. The butterfly valve 1 is received in the exhaust gas recirculation passage 6 of the housing 4 and the nozzle 5 in an openable and closable manner. The butterfly valve 1 includes the valve shaft 13, which forms a rotational center of the butterfly valve 1. The butterfly valve 1 is a rotatable valve of a butterfly type (butterfly type valve) that rotates relative to the hosing 4 to open and close the exhaust gas recirculation passage 6. Furthermore, the butterfly valve 1 is a swash plate like valve and is fixed to one axial end of the valve shaft 13 in a state where the butterfly valve 1 is tilted by a predetermined angle relative to the central axis of the valve shaft 13, which is rotated by the drive force (hereinafter, the drive torque) of the motor 9.

The butterfly valve 1 is rotatable within a predetermined valve control range, which is limited by first and second stoppers, based on a control signal received from the ECU 10 during the engine operating period. When the EGRV opening degree of the butterfly valve 1 is changed within the valve control range, the open area of the exhaust gas recirculation passage 6 (the exhaust gas flow cross sectional area) is changed to change the EGR quantity (the fluid flow quantity) of the EGR gas, which is mixed into the intake air that flows in the intake air passage.

Furthermore, the butterfly valve 1 has a valve outer diameter portion, which has an outer diameter that is smaller than an inner diameter of the cylindrical nozzle 5 fitted into the housing 4. The annular seal ring groove is formed continuously in the circumferential direction in an outer peripheral surface (a radially outer end circumferential surface) 15 of the valve outer diameter portion of the butterfly valve 1. That is, the seal ring groove is circumferentially extends all around the radially outer end circumferential surface 15 of the butterfly valve 1. The single seal ring 3 is fitted into the interior of the seal ring groove.

The seal ring 3 is configured into a C-shape and has a predetermined gap (not shown) between two circumferentially opposed ends of the seal ring 3 to enable expansion and contraction of the seal ring 3 caused by a difference in the thermal expansion coefficient between the housing 4 and the seal ring 3. The radially outer end circumferential surface of the seal ring 3 is used as a sealing slide surface (hereinafter, referred to as a slide surface), which slidably contacts a passage wall surface of the housing 4 (an inner peripheral surface of the nozzle 5) within a predetermined rotational angular range, which is located around the valve full close position, at the time of valve closing movement of the butterfly valve 1. Two axially opposed edges of the slide surface of the seal ring 3 may be tapered or rounded to enable smooth opening and closing movement of the butterfly valve 1.

Furthermore, a radially inner side of the seal ring 3 is provided with a radially inner end portion, which is fitted into the seal ring groove of the butterfly valve 1 in a movable manner in the radial direction, the axial direction and the circumferential direction. Also, a radially outer side of the seal ring 3 is provided with a radially outer end portion, which projects outwardly from the radially outer end circumferential surface 15 of the butterfly valve 1 in the radial direction of the butterfly valve 1. That is, in the state where the radially outer end portion of the seal ring 3 radially outwardly protrudes from the radially outer end circumferential surface 15 of the butterfly valve 1, the radially inner end portion of the seal ring 3 is held in the seal ring groove in the movable manner in the radial direction, the axial direction and the circumferential direction.

The housing 4 of the present embodiment is made of an aluminum alloy and is formed into a predetermined shape through die-casting. The housing 4 is a device (valve housing), which holds the butterfly valve 1 in the interior of the exhaust gas recirculation passage 6 in the rotatable manner (openable and closable manner) in the rotational direction from the valve full close position to the valve full open position. The housing 4 is fixed to the exhaust gas recirculation pipe (or the exhaust pipe or the intake pipe) with a fixing element, such as a bolt (not shown).

Furthermore, the housing 4 includes a valve shaft bearing portion 20, which rotatably, slidably supports the valve shaft 13 through shaft bearing components, such as a bushing 17, an oil seal 18 and a ball bearing 19.

A shaft receiving hole 21 is formed in the valve shaft bearing portion 20 to extend in the axial direction of the valve shaft 13. A communication hole 22 is formed at a nozzle side of the shaft receiving hole 21. The communication hole 22 is provided to return impurities (e.g., combustion residues and carbon particles) contained in the exhaust gas entered into the shaft receiving hole 21 toward the interior of the exhaust gas recirculation passage, which is located on the downstream side of the butterfly valve 1 in the EGR gas flow direction, through use of, for example, an intake pipe negative pressure.

The housing 4 further includes a cylindrical nozzle engaging portion (a cylindrical portion) 23, into which the nozzle 5 is fitted. Also, the housing 4 is connected with a coolant pipe 25, which conducts engine coolant into a coolant circulation passage 24 that is formed, for example, around the valve full close position or around the valve shaft bearing portion 20 or the nozzle engaging portion 23. The housing 4 forms a gear receiving chamber (a motor receiving chamber) 26, which receive the motor 9 and a speed reducing gear mechanism, between a sensor cover 8 and the gear housing 14.

The nozzle 5 is a cylindrical portion, which forms a portion of the exhaust gas recirculation pipe and receives the butterfly valve 1 in the openable and closable manner. The nozzle 5 is made of the heat resistant material (e.g., stainless steel) and is configured into a cylindrical pipe form. The nozzle 5 is fitted into the inner peripheral part of the nozzle engaging portion 23 of the housing 4 by, for example, press fitting. The exhaust gas recirculation passage 6 is formed in the interior of the nozzle 5. A seal ring seat surface (also referred to as a contact surface, and will be hereinafter referred to as a seat surface) is formed in the inner peripheral surface of the nozzle 5, particularly, in the inner peripheral surface (the passage wall surface of the housing 4) around the valve full close position of the nozzle 5. The seat surface is tightly engageable with the slide surface of the seat ring 3 at the time of the closing movement of the butterfly valve 1. The nozzle 5 has a shaft receiving hole 29, through which the valve shaft 13 is received.

The spring 7 includes a return spring 31 and a default spring 32. The return spring 31 applies an urging force (a spring load) to urge the butterfly valve 1 in the valve closing direction relative to a final gear (a third gear described latter), which is closest to the butterfly valve 1 among first to third gears of the sped reducing gear mechanism. The default spring 32 applies an urging force (a spring load) to urge the butterfly valve 1 in the valve opening direction relative to the third gear.

The spring 7 is received between a first recess 33 and a second recess 34, which are annular and are provided to the outer wall portion of the housing 4 (the gear housing 14) and an annular part of the third gear, respectively. One end portion (a left end portion in the drawing) of the return spring 31 and the other end portion (a right end portion in the drawing) of the default spring 32 are wound in opposite directions, respectively, and the other end portion (a right end portion in the drawing) of the return spring 31 and the one end portion (a left end portion in the drawing) of the default spring 32 are joined together, so that the single coil spring is formed as the spring 7.

A U-shaped hook 36 is provided in a connection between the other end portion of the return spring 31 and the one end portion of the default spring 32. At the time of stopping the engine or at the time of stopping the electric power supply to the motor 9, the U-shaped hook 36 is held by a block-shaped intermediate stopper 35, which is formed integrally in the gear housing 14 of the housing 4. The U-shaped hook 36 is formed by bending the connection between the return spring 31 and the default spring 32 into an inverted U-shape. The one end portion of the return spring 31 is engaged with the first recess 33 of the housing 4 and serves as a first valve urging means (a first spring) that urges the butterfly valve 1 from the valve full open position toward the valve full close position (in the valve closing direction). The other end portion of the default spring 32 is engaged with the second recess 34 of the third gear and serves as a second valve urging means (a second spring) that urges the butterfly valve 1 from the position, which is beyond the valve full close position, toward the valve full close position (in the valve opening direction).

The valve drive device, which drives the butterfly valve 1 to execute the valve opening movement or the valve closing movement thereof, is an electric actuator 120, which includes the motor 9 and the drive force transmission mechanism (the speed reducing gear mechanism in the present embodiment). The motor 9 generates the drive torque upon receiving the electric power. The drive force transmission mechanism transmits the rotational motion of the motor shaft (output shaft) 11 of the motor 9 to the valve shaft 13.

The motor 9 generates the drive torque to drive the butterfly valve 1 in the valve opening direction or the valve closing direction. The motor 9 is securely held in the gear housing 14, which is formed integrally at the outer wall portion of the housing 4. A direct current (DC) motor, such as a brushless DC motor or a brush DC motor, is used as the motor 9. Alternatively an alternating current (AC) motor, such as a three-phase induction motor, may be used as the motor 9.

The speed reducing gear mechanism includes the first to third gears 41-43, which are used to reduce the speed in two steps at a predetermined speed reducing ratio. The speed reducing gear mechanism forms the drive force transmission mechanism, which transmits the motor output shaft torque (the drive torque) of the motor 9 to the butterfly valve 1 through the valve shaft 13. The first to third gears 41-43 are rotatably received in the gear housing 14.

The first gear 41, which is the one of the components of the speed reducing gear mechanism, is a motor gear (a first rotatable body), which is fixed to an outer peripheral surface of the motor shaft 11. The first gear 41 is provided in a motor side end (a power source side end) in a drive force transmission path of the speed reducing gear mechanism. The first gear 41 is made of a metal material or a resin material and is configured into a cylindrical body. The first gear 41 includes a cylindrical portion, which circumferentially surrounds the outer peripheral surface of the motor shaft 11. The cylindrical portion of the first gear 41 is fixed to the outer peripheral surface of the motor shaft 11 by press fitting. A plurality of outwardly projecting teeth 44 is formed in an outer peripheral surface of the cylindrical portion of the first gear 41 such that the teeth 44 are arranged one after another at generally equal intervals along the entire outer peripheral surface of the cylindrical portion of the first gear 41 and are meshed with the second gear 42.

The second gear 42, which is the one of the components of the speed reducing gear mechanism, is an intermediate speed reducing gear (a second rotatable body), which is meshed with the teeth 44 formed along the outer peripheral surface of the first gear 41. The second gear 42 is placed between the first gear 41 and the third gear 43 in the drive force transmission path of the speed reducing gear mechanism. The second gear 42 is made of a resin material and is configured into a cylindrical body. The second gear 42 includes a cylindrical portion, which circumferentially surrounds an outer peripheral surface of the intermediate shaft 12 that is placed parallel to the motor shaft 11 of the motor 9 and the valve shaft 13.

The cylindrical portion of the second gear 42 is rotatably fitted to an outer peripheral surface of the intermediate shaft 12 in such a manner that the cylindrical portion of the second gear 42 is rotatable relative to the intermediate shaft 12. The cylindrical portion of the second gear 42 includes an annular part and a cylindrical part. The annular part forms a maximum outer diameter part of the second gear 42, and the cylindrical part has an outer diameter smaller than that of the annular part. A plurality of outwardly projecting teeth (a large diameter gear) 45 is formed in an outer peripheral surface of the annular part of the second gear 42 such that the teeth 45 are arranged one after another at generally equal intervals along the entire outer peripheral surface of the annular part of the second gear 42 and are meshed with the teeth 44 of the first gear 41. Furthermore, a plurality of outwardly projecting teeth (a small diameter gear) 46 is formed in an outer peripheral surface of the cylindrical part of the second gear 42 such that the teeth 46 are arranged one after another at generally equal intervals along the entire outer peripheral surface of the cylindrical part of the second gear 42 and are meshed with a plurality of outwardly projecting teeth formed in an outer peripheral surface of the third gear 43.

The third gear 43, which is the one of the components of the speed reducing gear mechanism, is a valve gear (a third rotatable body), which is meshed with the small diameter gear 46 formed in the outer peripheral surface of the second gear 42. The third gear 43 is provided in a valve side end (a movable body side end) in the drive force transmission path of the speed reducing gear mechanism. The third gear 43 is made of a resin material and is configured into a cylindrical body. The third gear 43 includes a cylindrical portion, which circumferentially surrounds the outer peripheral surface of the valve shaft 13.

A valve gear plate 47 is insert molded into the cylindrical portion of the third gear 43. The cylindrical portion of the third gear 43 includes an annular part, which forms the maximum outer diameter part of the third gear 43. A plurality of outwardly projecting teeth 49 is formed in an outer peripheral surface of the annular part of the third gear 43 such that the teeth 45 are arranged one after another at generally equal intervals along a circumferential portion (an arcuate portion or a partially annular portion) on the outer peripheral surface of the annular part of the third gear 43 and are meshed with the small diameter gear 46 of the second gear 42.

An opener lever (not shown), which is meshed with the spring 7, is provided to the third gear 43. An anchoring portion, to which the other end portion of the default spring 32 is anchored, and an engaging portion, which is detachably engages the U-shaped hook 36 of the spring 7, are provided in the opener lever.

A full close side stopper portion 51 is provided in the outer peripheral surface of the third gear 43. The full close side stopper portion 51 is mechanically engaged with a block-shaped full close side stopper (a first stopper) 53, which is formed integrally at the gear housing 14, when the butterfly valve 1 is rotated in the valve closing direction beyond the valve full close position. The full close side stopper 53 is used as a first limiting portion, which limits a rotatable range of the butterfly valve 1, the valve shaft 13 and the third gear 43 in the valve closing direction. When the full close side stopper portion 51 of the third gear 43 abuts the full close side stopper 53, further rotation of the movable members, such as the butterfly valve 1, in the valve closing direction is limited.

In the present embodiment, a maximum full close side opening degree, which is limited by the full close side stopper 53, is set to be an opening degree that is slightly opened by a small degree (e.g., generally $\theta=-17$ degrees) from the valve full close position where the opening degree is $\theta=0$ degree.

Furthermore, a full open side stopper portion 52 is provided in the outer peripheral surface of the third gear 43. The full open side stopper portion 52 is mechanically engaged with a block-shaped full open side stopper (a second stopper) 54, which is formed integrally at the gear housing 14, when the butterfly valve 1 is rotated in the valve opening direction beyond the valve full open position. The full open side stopper 54 is used as a second limiting portion, which limits a rotatable range of the butterfly valve 1, the valve shaft 13 and the third gear 43 in the valve opening direction. When the full open side stopper portion 52 of the third gear 43 abuts the full open side stopper 54, further rotation of the movable members, such as the butterfly valve 1, in the valve opening direction is limited.

In the present embodiment, a maximum full open side opening degree (the valve full open position), which is limited by the full open side stopper 54, is set to be an opening degree that is slightly opened by a predetermined degree (e.g., generally $\theta=+60$ to 90 degrees, desirably $\theta=+70$ degrees) from the valve full close position where the opening degree is $\theta=0$ degree.

Here, the motor shaft 11 is rotatably received in the gear housing 14. The motor shaft 11 linearly extends in the axial direction. One axial end portion of the intermediate shaft 12 is press fitted into an engaging recess, which is provided in the gear housing 14. The intermediate shaft 12 linearly extends in the axial direction. The valve shaft 13 is made of a heat resistant material (e.g., stainless steel) and is rotatably or slidably received in the shaft receiving hole 21, which is provided in the valve shaft bearing portion 20 of the housing 4. The valve shaft 13 has a circular cross section and is formed as a cylindrical metal member that extends linearly from one end to the other end thereof.

The one axial end side of the valve shaft 13 penetrates through the shaft receiving hole 21 of the housing 4 and the shaft receiving hole 29 of the nozzle 5 and projects (being disposed) in the interior of the exhaust gas recirculation passage 6. A valve installation portion (a shaft side engaging portion), to which the butterfly valve 1 is secured by a welding means, is provided in the one axial end portion (the valve side end portion) of the valve shaft 13. A swaging fixing portion is formed integrally in the other axial end portion (the end portion opposite from the valve side) of the valve shaft 13. The valve gear plate 47, which is insert molded into the third gear 43, is fixed to the swaging fixing portion by a fixing means, such as swaging.

Here, the energization of the actuator 120, particularly the motor 9 is controlled by the ECU 10. The ECU 10 has a microcomputer of a known structure, which includes a CPU, a storage device (a memory such as a ROM, a RAM), an input circuit (an input device) and an output circuit (an output device). The CPU executes control processes and computing processes. The storage device stores control programs, control logics and various types of data.

Furthermore, the ECU 10 includes an IG signal sensing device, which senses an ON signal (IG ON signal) and an OFF signal (IG OFF signal) of an ignition switch (not shown). When the ON signal (IG ON signal) of the ignition switch is sensed with the IG signal sensing device, the ECU 10 turns on a main relay (not shown), which connects and disconnects an ECU power supply line that connects between the ECU 10 and a battery (an on-vehicle electric power source).

When the ignition switch is turned on (IG ON), the main relay is turned on, and thereby the ECU 10 executes a feedback control operation of the drive torque of the motor 9, i.e., a feedback control operation of the electric power supplied to the motor 9. In this feedback control operation, the ECU 10 controls the electric power supplied to the motor 9 such that an actual opening degree (also referred to as an actual valve opening degree, an actual EGR opening degree, an EGRV opening degree), which is sensed with a valve opening degree sensor (an EGR quantity sensor) 130 described latter, generally coincides with a target opening degree (also referred to as a target valve opening degree, a target EGR opening degree), which is a control target value that is set in response to a change in the operational state of the engine, based on the corresponding control program or control logic stored in the memory.

Furthermore, when the ignition switch is turned off (IG OFF), the main relay is turned off, and thereby the ECU 10 forcefully terminates the above control operation of the EGR valve, which is executed based on the control program or control logic stored in the memory.

Here, it should be noted that the ECU 10 is constructed to maintain the idling control operation of the engine or the EGRV opening and closing control operation (deposit scraping action) after the turning off of the ignition switch by delaying the turning off of the main relay until satisfaction of a predetermined condition (until elapse of a predetermined time period or until the end of the deposit scraping action) even upon the turning of an engine key (or an engine switch) from an IG position to an ACC position or an OFF position to turn off the ignition switch (IG OFF) for the purpose of terminating the operation of the engine.

Sensor signals from various sensors, such as a crank angle sensor, an accelerator opening degree sensor, an air flow meter and a coolant temperature sensor, are supplied to the microcomputer of the ECU 10 after an A/D conversion thereof through an A/D converter. The ECU 10 serves as a rotational speed sensing means for sensing an engine rotational speed by measuring interval time of NE pulse signals outputted from the crank angle sensor.

The EGR quantity sensor 130 is connected to the microcomputer. The EGR quantity sensor 130 converts the opening degree of the butterfly valve 1 of the EGRV 110 (the EGRV opening degree) into the corresponding electric signal to indicate the quantity of the EGR gas mixed into the intake air flowing in the intake pipe, i.e., to indicate the EGR quantity of the EGR gas supplied into the intake pipe.

The EGR quantity sensor 130 is a contactless type rotational angle sensing device (a valve position sensing means, a vale opening degree sensing means), which senses a rotational angle (the current position, the EGRV opening degree) of the butterfly valve 1. The EGR quantity sensor 130 includes divided permanent magnets, a yoke (having divided yoke segments) 55 and a Hall IC 56. The magnets are fixed to an inner peripheral surface of the third gear 43. The yoke 55 is magnetized by the magnets. The Hall IC 56 is placed on the sensor cover side. The Hall IC 56 outputs an output signal (a voltage single), which corresponds to a density of a magnetic flux that flows across the Hall IC 56. In place of the Hall IC 56, a Hall element(s) alone or a magnetoresistive element(s) may be used as the contactless magnetic sensing element(s).

Figure 2:
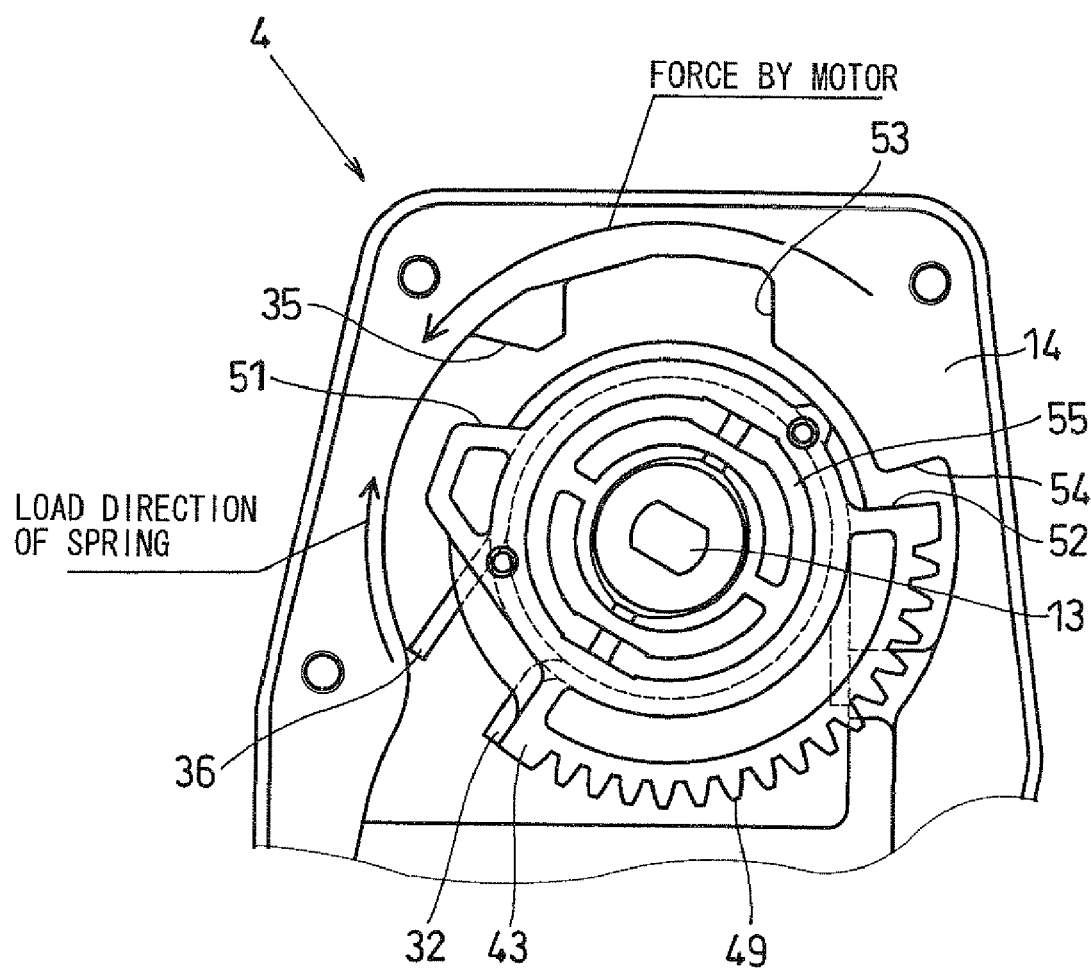
FIG. 2 is a diagram showing a load direction of a spring in a valve full open position of a butterfly valve according to the embodiment.

The ECU 10 stores the position of the butterfly valve 1 shown in FIG. 2, at which the butterfly valve 1 is fully opened to have the full open opening degree, as the valve full open position in the memory. The valve full open position is a valve position, at which the gap (the EGR gas leak quantity) between the radially outer end circumferential surface 15 of the butterfly valve 1 and the seat surface of the nozzle 5 is maximized, and at which the EGRV opening degree is set to maximize the EGR quantity of the EGR gas that flows in the exhaust gas recirculation passage 6.

Figure 3:
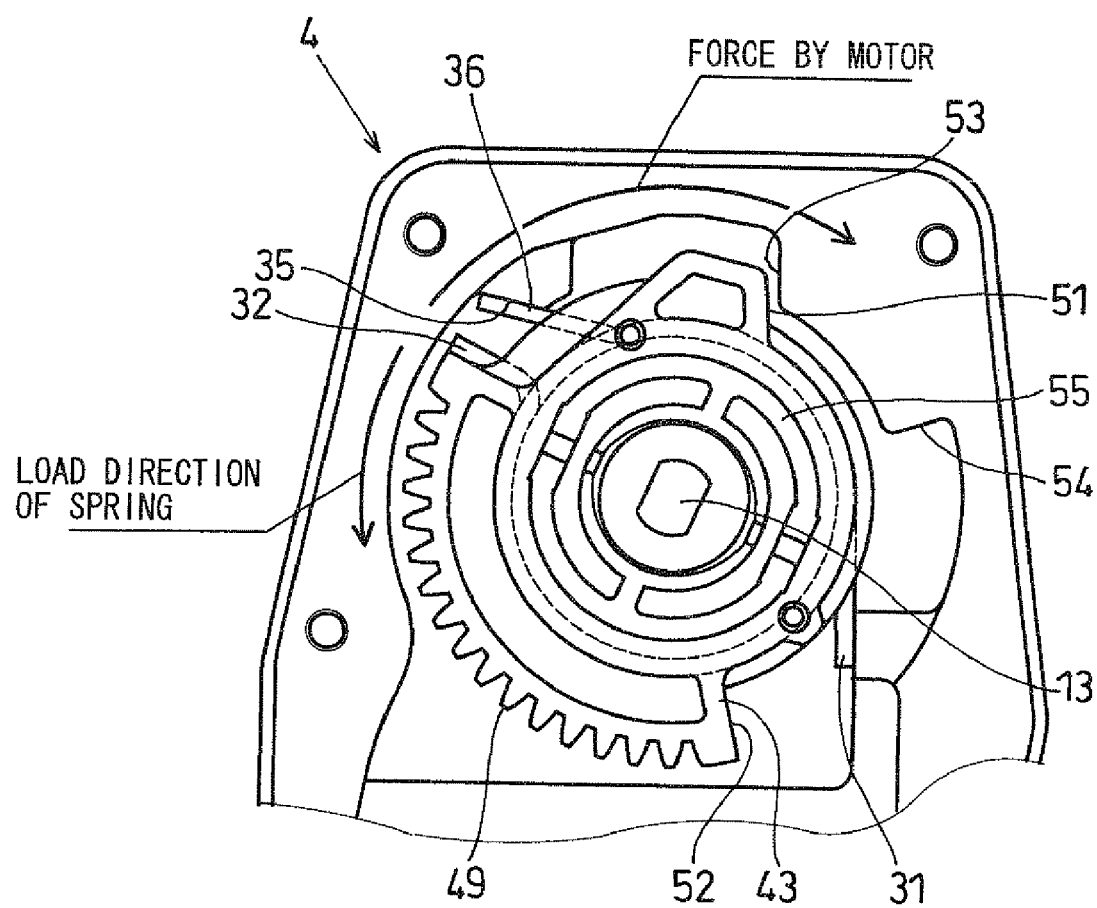
FIG. 3 is a diagram showing a load direction of the spring in a valve full close position of the butterfly valve according to the embodiment.

Furthermore, the ECU 10 stores the position of the butterfly valve 1 shown in FIG. 3, at which the butterfly valve 1 is fully closed to have the full close opening degree, as the valve full close position in the memory. The valve full close position is a valve position, at which the gap (the EGR gas leak quantity) between the radially outer end circumferential surface 15 of the butterfly valve 1 and the seat surface of the nozzle 5 is minimized, and at which the EGRV opening degree is set to minimize the EGR quantity of the EGR gas that flows in the exhaust gas recirculation passage 6.

Here, the ECU 10 stores a valve stop position, at which the butterfly valve 1 is urged by the urging force of the spring 7 at the time of stopping the supply of the electric power to the motor 9, as a full close point ($\theta=0$ degree) used in the control operation in the memory of the microcomputer.

Figure 4:
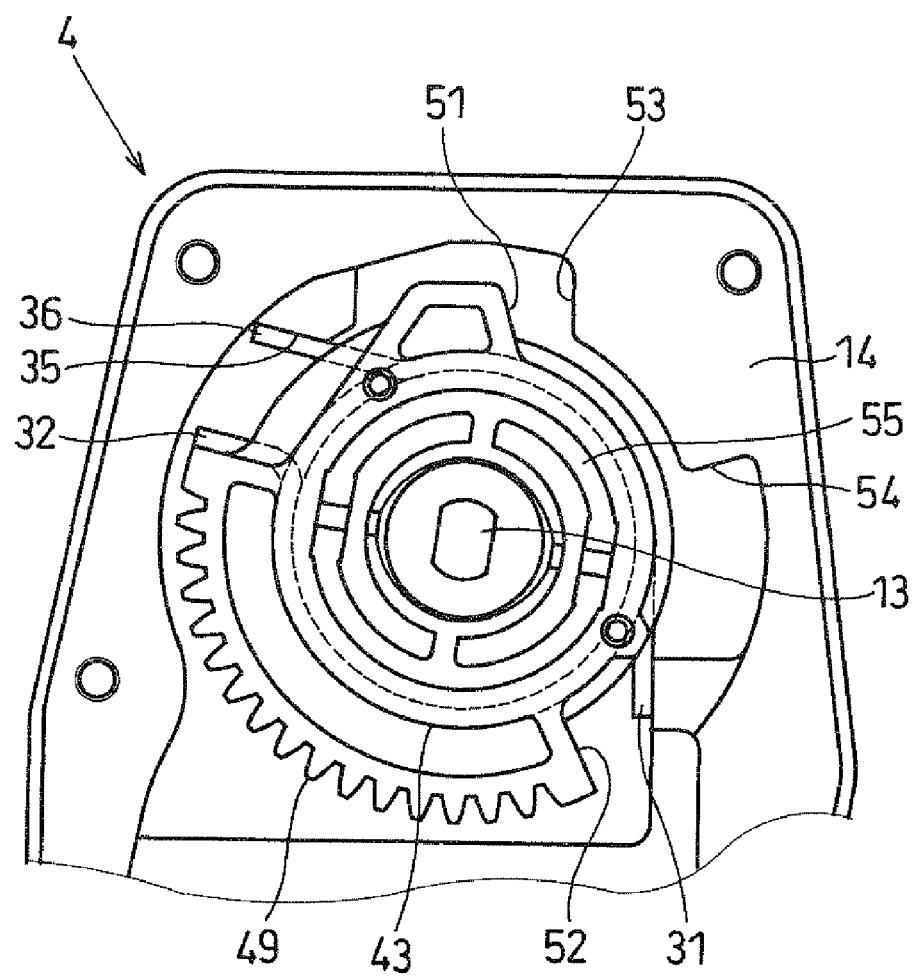
FIG. 4 is a diagram showing a neutral state of the spring at a spring balance point according to the embodiment.

In the present embodiment, as shown in FIG. 4, a neutral position (a spring balance point), at which the urging force (the spring load) of the return spring 31 is balanced with the urging force (the spring load) of the default spring 32, is set adjacent to the valve full close position (the valve position that is achieved by slightly rotating the butterfly valve 1 from the valve full close position in the valve opening direction). Thus, the ECU 10 stores the spring balance point as a full close point ($\theta=0$ degree), which is used in the control operation, in the memory of the microcomputer.

The return spring 31 serves as a first valve urging means for applying the spring load to the third gear 43, which is integrally installed to the valve shaft 13 secured with the butterfly valve 1, from at least a first intermediate position in a direction of returning the butterfly valve 1 toward the spring balance point (the valve closing direction). The default spring 32 serves as a second valve urging means for applying the spring load to the third gear 43 from at least a second intermediate position in a direction of returning the butterfly valve 1 toward the spring balance point (the valve opening direction).

The first intermediate position is a valve position (for achieving an intermediate opening degree), which is achieved by rotating the butterfly valve 1 from the spring balance point in the valve opening direction. The second intermediate position is a valve position (for achieving an intermediate opening degree), which is achieved by rotating the butterfly valve 1 from the spring balance point in the valve closing direction by a small amount. The ECU 10 stores the first intermediate position as the valve open side maximum opening degree ($\theta=+30$ degrees) in the memory. Also, the ECU 10 stores the second intermediate position as the valve close side maximum opening degree ($\theta=-30$ degrees) in the memory.

Here, the ECU 10 of the present embodiment uses the spring balance point, the first intermediate position and the second intermediate position as the target opening degrees, which are the control target values of the butterfly valve 1, at the time of executing the deposit scraping operation.

In the rotational movement of the butterfly valve 1 from the spring balance point in the valve opening direction, the U-shaped hook 36 of the spring 7 moves away from the intermediate stopper 35 in the valve opening direction, as shown in FIG. 2. Thus, the urging force (the spring load) of the default spring 32 is not applied to the third gear 43, and the urging force (the spring load) of the return spring 31 is applied to the third gear 43.

In the rotational movement of the butterfly valve 1 from the spring balance point in the valve closing direction, the U-shaped hook 36 of the spring 7 is urged against the intermediate stopper 35, as shown in FIG. 3. Thus, the urging force (the spring load) of the return spring 31 is not applied to the third gear 43, and the urging force (the spring load) of the default spring 32 is applied to the third gear 43.

Therefore, in the EGRV 110 of the present embodiment, the spring balance point, at which the spring load of the return spring 31 is balanced with the spring load of the default spring 32, is set as the turning point of the butterfly valve 1. Then, the load direction of the spring 7 during the movement of the butterfly valve 1 in the valve opening direction (during the time of directing the drive torque of the motor 9 toward the full open side) is reversed from the load direction of the spring 7 during the movement of the butterfly valve 1 in the valve closing direction (during the time of directing the drive torque of the motor 9 toward the full close side) at the spring balance point.

In the EGRV 110 of the present embodiment, the C-shaped seal ring 3, which implements the sealing function against the seat surface of the nozzle 5 through use of the radially outward tension of the C-shaped seal ring 3, is fitted into the seal ring groove of the butterfly valve 1.

In this kind of the EGRV 110, a stationary range (an EGR gas leak quantity insensible range), in which the EGR gas leak quantity does not change, is created around the valve full close position (e.g., generally ±2.5 to 5.5 degrees, or ±3.0 to 5.0 degrees, or ±3.5 degrees before and after the valve full close position) due to the radially outward tension of the seal ring 3. This is due to the following reason. That is, since the seal ring 3 is radially outwardly expandable due to the radially outward tension of the seal ring 3, the seal ring 3 can maintain the close contact relative to the seat surface of the nozzle 5 even when the valve position of the butterfly valve 1 is shifted out of the valve full close position ($\theta=0$ degree) until the time of reaching a radial displaceable limit (radial expandable limit) of the seal ring 3.

Here, when the ignition switch is turned off (IG OFF), the ECU 10 of the present embodiment variably controls the supply of the electric power to the motor 9 in such a manner that the butterfly valve 1 of the EGRV 110 repeats several opening and closing movements (e.g., five times) while passing through the neutral position (the spring balance point), which is set around the valve full close position, within a predetermined EGRV opening degree range (a valve opening degree range that includes the EGR gas leak quantity insensible range).

Specifically, the deposit scraping action is made when the supply of the electric power to the motor 9 is variably controlled such that the opening and closing is movement of the butterfly valve 1 is repeated for the five times within the predetermined EGRV opening degree range (the valve opening degree range) between the first intermediate position and the second intermediate position.

The time period or the number of times for executing the opening and closing movements (deposit scraping action) of the butterfly valve 1 of the EGRV 110 within the predetermined EGRV opening degree range is determined according to a cumulative engine operating time period and/or a cumulative value of a particulate quantity (PM quantity) contained in the exhaust gas. Here, the number of the deposit scraping action may be set to one, if desired.

Figure 5:
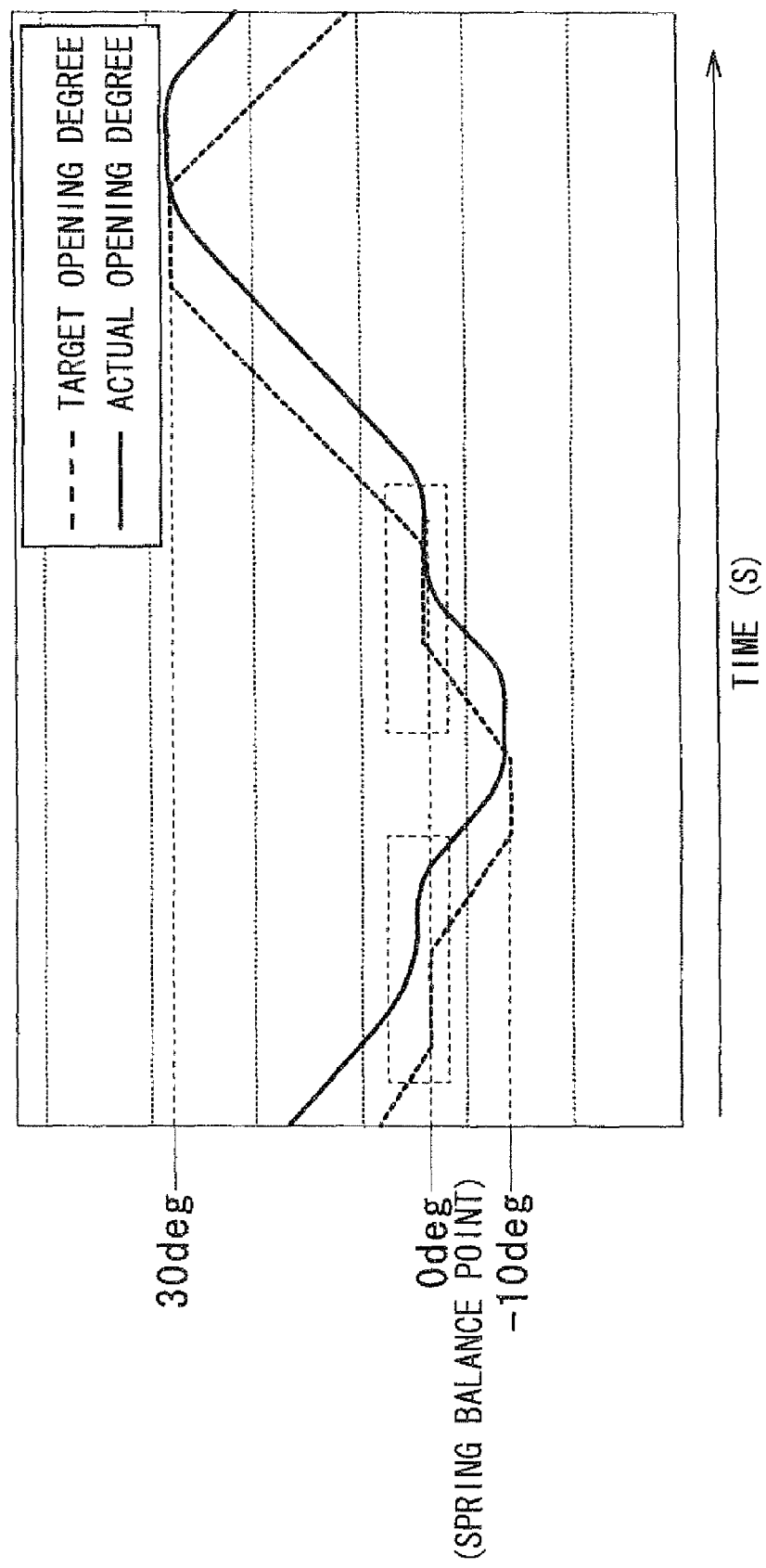
FIG. 5 is a timing chart showing a change in a target opening degree of the butterfly valve and an actual opening degree of the butterfly valve at the time of executing the deposit scraping action according to the embodiment.
Figure 6:
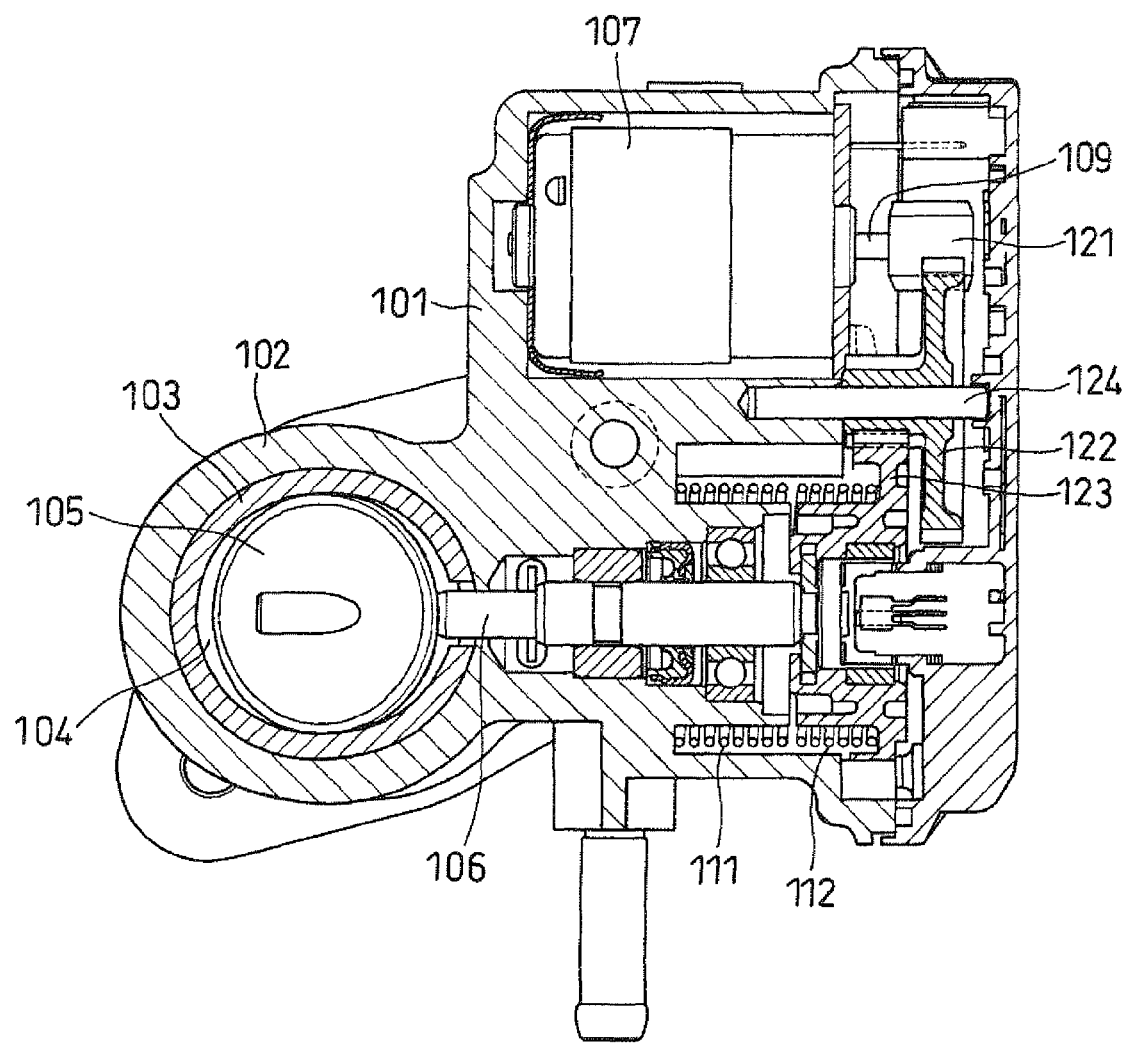
FIG. 6 is a cross sectional view of a prior art exhaust gas recirculation control valve (EGRV)
Figure 7:
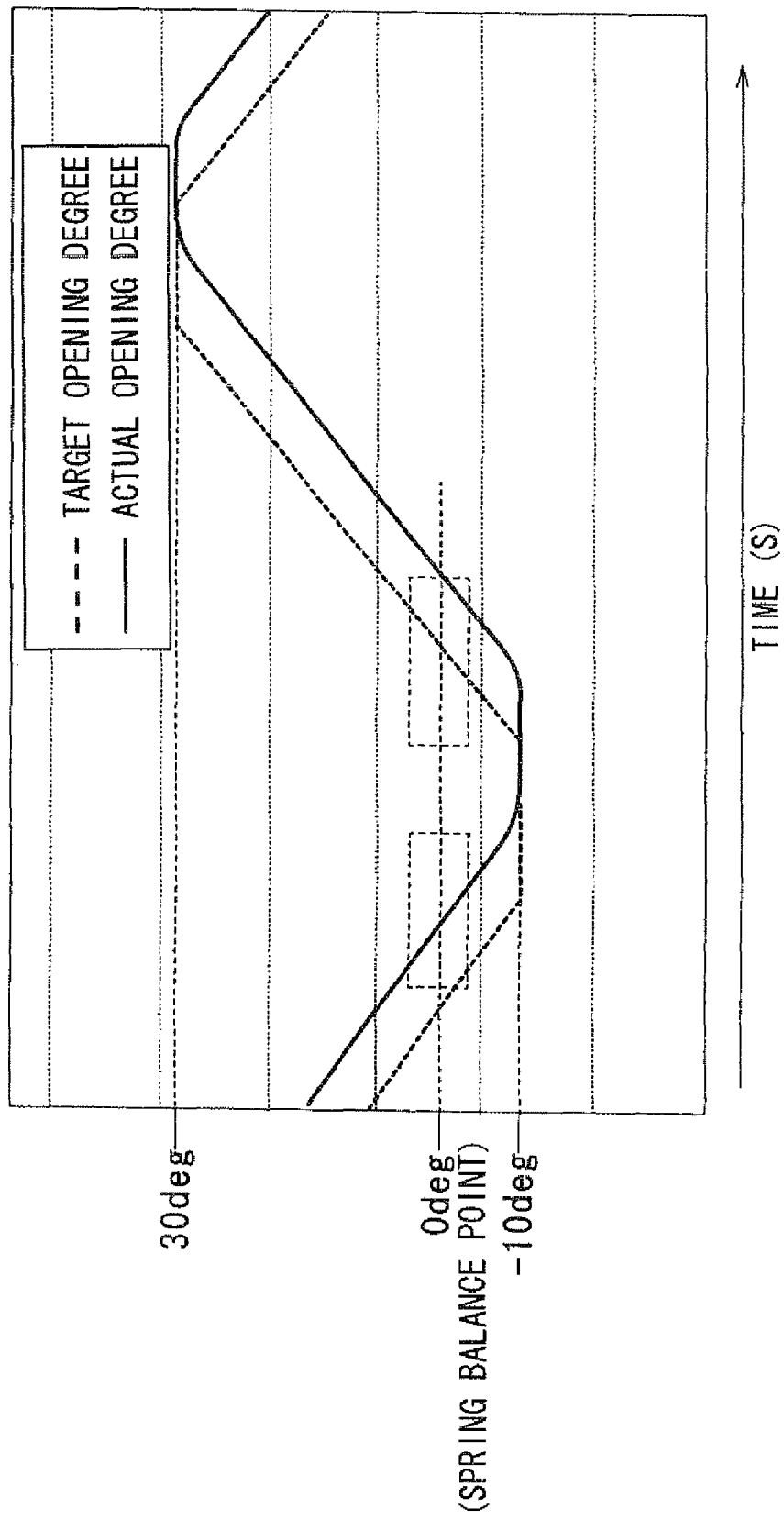
FIG. 7 is a timing chart showing a change in a target opening degree of the butterfly valve and an actual opening degree of a butterfly valve at the time of executing the deposit scraping action according to the prior art.

Next, the deposit scraping action, which is implemented by the EGR control system (the valve opening and closing control apparatus) of the internal combustion engine according to the present embodiment, will be described with reference to FIGS. 1 to 5. Here, FIG. 5 is a timing chart showing a change in the target opening degree (the target EGR opening degree), which is the control target value, and a change in the actual opening degree (the actual EGR opening degree, the EGRV opening degree).

When the ignition switch is turned off (IG OFF), the ECU 10 executes the deposit scraping action. Then, the ECU 10 senses the EGRV opening degree (the actual opening degree), which is computed (sensed) based on the output single of the EGR quantity sensor 130 (the Hall IC 56). Hereinafter, for the descriptive purpose, it is assumed that the current EGRV opening degree (the actual opening degree) of the butterfly valve 1 is at the valve position (e.g., the first intermediate position), which is located on the valve opening side of the spring balance point in the valve opening direction.

In this case, when the butterfly valve 1 is driven from particularly the first intermediate position beyond the spring balance point toward the second intermediate position at the time of executing the deposit scraping action, the ECU 10 sets the spring balance point (the neutral position, the neutral opening degree) as the target EGR opening degree (the target opening degree), which is the control target value, until reaching a point (location) immediately before the spring balance point. That is, the target EGR opening degree (the target opening degree), which is the control target value, is changed from the previous target opening degree before the execution of the deposit scraping action to the spring balance point ($\theta=0$ degree).

Thus, the electric power, which is supplied to the motor 9, is adjusted such that the EGRV opening degree (the actual opening degree) coincides with the spring balance point ($\theta=0$ degree). At this time, in an initial state of the valve closing movement from the first intermediate position to the spring balance point, an acceleration control operation is executed to progressively accelerate the moving speed of the butterfly valve 1 toward the spring balance point.

Then, in an intermediate stage of the valve closing movement from the first intermediate position to the spring balance point, a constant speed control operation is executed to maintain the moving speed of the butterfly valve 1 at the constant speed.

Next, at the time right before reaching of the EGRV opening degree (the actual opening degree) to the spring balance point, a deceleration control operation is executed to progressively decelerate the moving speed of the butterfly valve 1 toward the spring balance point.

Thereafter, as indicated in the timing chart of FIG. 5, when the EGRV opening degree (the actual opening degree), which is sensed with the Hall IC 56, reaches the spring balance point, the ECU 10 changes the target EGR opening degree (the target opening degree), which is the control target value, to the second intermediate position. That is, the target EGR opening degree (the target opening degree), which is the control target value, is changed from the spring balance point to the second intermediate position ($\theta=-10$ degrees).

Thus, the electric power, which is supplied to the motor 9, is adjusted such that the EGRV opening degree (the actual opening degree) coincides with the second intermediate position ($\theta=-10$ degrees). At this time, in an initial state of the valve closing movement from the spring balance point to the second intermediate position, an acceleration control operation is executed to progressively accelerate the moving speed of the butterfly valve 1 toward the second intermediate position.

Then, in an intermediate stage of the valve closing movement from the spring balance point to the second intermediate position, a constant speed control operation is executed to maintain the moving speed of the butterfly valve 1 at the constant speed.

Next, at the time right before reaching of the EGRV opening degree (the actual opening degree) to the second intermediate position, a deceleration control operation is executed to progressively decelerate the moving speed of the butterfly valve 1 toward the second intermediate position.

Thereafter, as indicated in the timing chart of FIG. 5, when the EGRV opening degree (the actual opening degree), which is sensed with the Hall IC 56, reaches the second intermediate position, the ECU 10 changes the target EGR opening degree (the target opening degree), which is the control target value, to the spring balance point. That is, the target EGR opening degree (the target opening degree), which is the control target value, is changed from the second intermediate position to the spring balance point ($\theta=0$ degree).

At this stage, the ECU 10 variably controls the drive torque of the motor 9, i.e., the electric power (e.g., the motor current) supplied to the motor 9 in such a manner that the moving direction of the butterfly valve 1 of the EGRV 110 is reversed when the EGRV opening degree (the actual opening degree) reaches the second intermediate position upon passing through the spring balance point. Specifically, the rotational direction of the motor shaft 11 of the motor 9 is reversed.

Thus, the electric power, which is supplied to the motor 9, is adjusted such that the EGRV opening degree (the actual opening degree) coincides with the spring balance point ($\theta=0$ degree). At this time, in an initial state of the valve opening movement from the second intermediate position to the spring balance point, an acceleration control operation is executed to progressively accelerate the moving speed of the butterfly valve 1 toward the spring balance point.

Then, in an intermediate stage of the valve opening movement from the second intermediate position to the spring balance point, a constant speed control operation is executed to maintain the moving speed of the butterfly valve 1 at the constant speed.

Next, at the time right before reaching of the EGRV opening degree (the actual opening degree) to the spring balance point, a deceleration control operation is executed to progressively decelerate the moving speed of the butterfly valve 1 toward the spring balance point.

Thereafter, as indicated in the timing chart of FIG. 5, when the EGRV opening degree (the actual opening degree), which is sensed with the Hall IC 56, reaches the spring balance point, the ECU 10 changes the target EGR opening degree (the target opening degree), which is the control target value, to the first intermediate position. That is, the target EGR opening degree (the target opening degree), which is the control target value, is changed from the spring balance point to the first intermediate position ($\theta=+30$ degrees).

Thus, the electric power, which is supplied to the motor 9, is adjusted such that the EGRV opening degree (the actual opening degree) coincides with the first intermediate position ($\theta=+30$ degrees). At this time, in an initial state of the valve opening movement from the spring balance point to the first intermediate position, an acceleration control operation is executed to progressively accelerate the moving speed of the butterfly valve 1 toward the first intermediate position.

Then, in an intermediate stage of the valve opening movement from the spring balance point to the first intermediate position, a constant speed control operation is executed to maintain the moving speed of the butterfly valve 1 at the constant speed.

Next, at the time right before reaching of the EGRV opening degree (the actual opening degree) to the first intermediate position, a deceleration control operation is executed to progressively decelerate the moving speed of the butterfly valve 1 toward the first intermediate position.

Thereafter, as indicated in the timing chart of FIG. 5, when the EGRV opening degree (the actual opening degree), which is sensed with the Hall IC 56, reaches the first intermediate position, the ECU 10 changes the target EGR opening degree (the target opening degree), which is the control target value, to the spring balance point. That is, the target EGR opening degree (the target opening degree), which is the control target value, is changed from the first intermediate position to the spring balance point ($\theta=0$ degree).

At this stage, the ECU 10 variably controls the drive torque of the motor 9, i.e., the electric power (e.g., the motor current) supplied to the motor 9 in such a manner that the moving direction of the butterfly valve 1 of the EGRV 110 is reversed when the EGRV opening degree (the actual opening degree) reaches the first intermediate position upon passing through the spring balance point. Specifically, the rotational direction of the motor shaft 11 of the motor 9 is reversed. Each of the above control operations is executed by variably controlling the electric power (e.g., the motor current, the motor voltage) supplied to the electric motor 9.

The EGRV opening and closing control operation (deposit scraping action) after the turning off of the ignition is repeated within the predetermined EGRV opening degree range from the first intermediate position to the second intermediate position through the spring balance point.

The deposit, which is adhered to or accumulated at the passage wall surface (the seat surface of the nozzle 5) adjacent to or around the valve full close position of the housing 4, is scraped by the slide surface or the axially opposed edge portions of the seal ring 3, which is fitted and held in the seal ring groove of the butterfly valve 1, upon repeatedly executing the EGRV opening and closing control operation (the deposit scraping action) described above in the engine operation continuing period (the ON period of the ignition switch).

Thereby, the deposit is removed from the slide portion(s) between the butterfly valve 1 and the housing 4, particularly from the slide portion(s) between the slide surface of the seal ring 3 and the seat surface of the nozzle 5. As a result, the deposit, which is adhered to or accumulated around the butterfly valve 1 of the EGRV 110, can be removed, and thereby occurrence of the malfunctions, such as the valve sticking and valve movement malfunction, caused by the deposit accumulation and solidification can be limited.

Here, as shown in and described with reference to FIGS. 2 to 5 and 7, the spring balance point is set as the point, at which the spring load of the return spring 31 is balanced with the spring load of the default spring 32. Then, at the time of executing the deposit scraping action, the load direction of the spring 7 during the movement of the butterfly valve 1 in the valve opening direction (during the time of directing the drive torque of the motor 9 toward the full open side) is reversed from the load direction of the spring 7 during the movement of the butterfly valve 1 in the valve closing direction (during the time of directing the drive torque of the motor 9 toward the full close side) at the spring balance point.

At this time, the direction of the backlash between the tooth surfaces of the first and second gears 41, 42 and the direction of the backlash between the tooth surfaces of the second and third gears 42, 43 are reversed to cause generation of the hitting sound (tooth hitting sound, which is commonly known as rattle sound) upon the collision between the tooth surfaces of the adjacent gears.

In view of the above points, in the EGR control apparatus (the valve opening and closing control apparatus) of the internal combustion engine of the present embodiment, at the time of executing the deposit scraping action, the spring balance point is initially set as the target EGR opening degree (the target opening degree), which is the control target value. In this way, as indicated in FIG. 5, the deceleration control operation, which progressively decelerates the moving speed of the butterfly valve 1 toward the spring balance point, is started from the time point, which is immediately before reaching of the EGRV opening degree (the actual opening degree) sensed with the Hall IC 56 to the spring balance point (the control target value).

Thereby, the braking is applied to the change in the EGRV opening degree (the actual opening degree), so that the speed can be effectively reduced at the time of passing the spring balance point.

Here, at the time of reaching of the EGRV opening degree (the actual opening degree), which is sensed with the Hall IC 56, to the spring balance point, the drive torque of the motor 9 may be set to zero until the control time period elapses. Specifically, the motor current may be progressively reduced upon the starting of the deceleration control operation of the butterfly valve 1 and may be finally reduced to zero.

Furthermore, at the time of reaching of the EGRV opening degree (the actual opening degree), which is sensed with the Hall IC 56, to the spring balance point, the first intermediate position or the second intermediate position may be set as the target EGR opening degree (the target opening degree), which is the control target value. In this way, as indicated in FIG. 5, the acceleration control operation, which progressively accelerates the moving speed of the butterfly valve 1 toward the first intermediate position or the second intermediate position, is started from the time point, which is immediately after reaching of the EGRV opening degree (the actual opening degree) sensed with the Hall IC 56 to the spring balance point (the control target value).

In this way, at the time of executing the deposit scraping action, the butterfly valve 1 of the EGRV 110 passes the spring balance point at the low valve moving speed, which is implemented immediately before reaching the spring balance point, or at the low valve moving speed, which is implemented from the spring balance point to the first intermediate position or the second intermediate position.

That is, the butterfly valve 1 of the EGRV 110 passes the spring balance point at the low valve moving speed, so that the load direction of the spring 7 at the time of passing the spring balance point can be reversed at the low speed, and the direction of the backlash between the first and second gears 41, 42 and the direction of the backlash between the second and third gears 42, 43 can be reversed at the low speed. In this way, it is possible to reduce the hitting sound, which is generated upon the collision between the tooth surfaces of the first and second gears 41, 42 and the collision between the tooth surfaces of the second and third gears 42, 43 in the speed reducing gear mechanism.

Furthermore, the valve moving speed of the butterfly valve 1 of the EGRV 110 is reduced only at the time of passing the spring balance point, so that it is possible to limit the lengthening of the operational time period of the deposit scraping action.

Also, at the time of executing the deposit scraping action, the butterfly valve 1 of the EGRV 110 repeats the opening and closing movements across the spring balance point. Furthermore, the spring balance point is set at or around the valve full close position, so that the valve stop position of the butterfly valve 1 at the time of stopping the supply of the electric power to the motor 9 will not substantially deviate from the valve full close position. That is, the butterfly valve 1 is held in the closed state when the supply of the electric power to the motor 9 is stopped. In this way, at the time of failure of the EGRV 110, i.e., at the time of failure of the motor 9 (e.g., at the time of electrical wire braking failure), the EGR gas will not be recirculated into the combustion chamber of each cylinder of the engine, so that the recirculation quantity of the EGR gas (EGR quantity) does not become excessive to the intake air quantity. Therefore, it is possible to limit the occurrence of the misfire or the engine stall of the engine, and thereby it is possible to limit the occurrence of non-drivable state of the vehicle.

As a result, while the lengthening of the operational period of deposit scraping action is limited, or while the occurrence of the misfire or the engine stall of the engine is limited, the generation of the hitting sound, which is caused by the collision between the tooth surfaces of the adjacent gears of the speed reducing gear mechanism, can be limited at the time of executing the deposit scraping action.

Now, modifications of the above embodiment will be described.

In the above embodiment, the cylindrical nozzle 5 is fitted into and held in the nozzle engaging portion 23 of the housing 4, and the butterfly valve 1 is received in the nozzle 5 in the openable and closable manner. Alternatively, the butterfly valve 1 may be directly received in the openable and closable manner in the housing 4. In such a case, the nozzle 5 is not required, and thereby the number of components and the number of assembling steps can be reduced.

The seal ring groove (annular groove) may be eliminated from the radially outer end circumferential surface 15 of the butterfly valve 1. Also, the seal ring 3 may not be required to install to the radially outer end circumferential surface 15 of the butterfly valve 1. In such a case, the seal ring 3 is not required, and thereby the number of components and the number of assembling steps can be reduced.

In the above embodiment, the housing is made of the housing (valve housing) 4, which is connected to exhaust gas recirculation pipe of the exhaust gas recirculation apparatus and forms the portion of the exhaust gas recirculation pipe. Alternatively, the housing may be made of a housing, which forms a portion of the intake pipe or a portion of the exhaust pipe.

Furthermore, in the above embodiment, the butterfly valve 1 of the EGRV 110, which variably controls the exhaust gas recirculation quantity (EGR quantity) according to the operational state of the engine, is held and is fixed to the one axial end side (the distal end side) of the valve shaft 13 by using the fixing means (e.g., the welding). Alternatively, the butterfly valve 1 may be fixed to the one axial end side (the distal end side) or the middle portion of the valve shaft 13 by using screw(s), such as the connecting screw(s) or fixing bolt(s).

In the above embodiment, the valve drive device, which drives (opens or closes) the butterfly valve 1 of the EGRV 110, is formed as the electric actuator 120, which includes the motor 9 and the drive force transmission mechanism (e.g., the speed reducing gear mechanism). Alternatively, the valve drive device, which drives (opens or closes) the valve, may be formed as a negative pressure type actuator, which includes a solenoid type negative pressure control valve or an electric negative pressure control valve. Further alternatively, the valve drive device may be formed as a solenoid type actuator, such as a solenoid fluid control valve device.

Furthermore, the fluid flow quantity control valve, which includes the housing and the valve, may be applied as an intake air control valve (e.g., a throttle valve), an exhaust gas control valve or an idling rotational speed control valve instead of the EGRV 110 of the above embodiment. In such an instance, the intake air control valve controls the quantity of the intake air, which is drawn into the combustion chambers of the engine. The exhaust gas control valve controls the quantity of the exhaust gas, which is outputted from the combustion chambers of the engine. The idling rotational speed control valve controls the quantity of the intake air, which bypasses the throttle valve.

In the present embodiment, the valve opening and closing control apparatus is applied to the internal combustion engine flow quantity control apparatus (the exhaust gas recirculation apparatus), which controls the flow quantity of the fluid, such as the EGR gas (the high temperature fluid). However, the valve opening and closing apparatus of the present invention should not be limited to the internal combustion engine flow quantity control apparatus. That is, the fluid control valve device, which includes the housing and the valve, may be implemented as a fluid passage opening and closing valve, a fluid passage change valve or a fluid pressure control valve.

Furthermore, the fluid control valve device of the present invention may be applied to an intake air flow control valve (a tumble flow control valve or a swirl flow control valve) or a variable intake air valve, which changes a passage length or passage cross sectional area of the intake passage. Furthermore, the turbo-charger engine is used as the internal combustion engine. Alternatively, an internal combustion engine having no turbo-charger or a supercharger may be used as the internal combustion engine of the present invention. Also, a gasoline engine may be used as the internal combustion engine of the present invention.

In the above embodiment, the seat surface (the contact surface), which slidably contacts the slide surface of the seal ring 3, is provided in the portion of the passage wall surface of the housing 4. Alternatively, the seal ring groove and the seal ring 3 may be eliminated, and a contact surface, which slidably contacts the slide surface (e.g., the radially outer end circumferential surface 15) of the butterfly valve 1, may be provided in the portion of the passage wall surface of the housing 4. Furthermore, in the above embodiment, the butterfly valve 1 is used as the valve. Alternatively, a rotatable valve having one open end, a rotary valve, a poppet valve, a shutter valve, or a door type vale having only one side supported (cantilever valve) may be used as the valve of the present invention.

Furthermore, in the above embodiment, the speed reducing gear mechanism drives the valve shaft 13 of the butterfly valve 1 by reducing the rotational speed of the motor shaft 11 of the motor 9 at the predetermined speed reducing ratio in the two steps through the first to third gears 41-43 to increase the rotational torque of the motor 9. Alternatively, as the drive force transmission mechanism, the speed reducing gear mechanism may be formed by using a worm gear, which is fixed to the motor shaft of the motor, and a helical gear, which is meshed with and is rotated by the worm gear.

Also, a drive force transmission mechanism, which includes a rack and pinion mechanism (a moving direction change mechanism that converts a rotational movement to a linear movement), may be used. In the rack and pinion mechanism, a pinion gear is used as a final gear in the speed reducing gear mechanism, and rack teeth, which are meshed with the pinion gear, are provided in the valve shaft of the valve.

Furthermore, the intermediate shaft 12 may be rotatably supported by the housing 4 in such a manner that the intermediate shaft 12 is rotatable relative to the housing 4. In such a case, the second gear 42 may be fixed to the intermediate shaft 12.

Furthermore, the drive force transmission mechanism (e.g., the speed reducing gear mechanism) may be made of two gears, i.e., the first and second gears (the first and second rotatable body). Also, the drive force transmission mechanism (e.g., the speed reducing gear mechanism) may be made of four or more gears.

In the present embodiment, when the spring balance point is set to the full close point ($\theta=0$ degree) used in the control operation, the first intermediate position is set at the $\theta=+30$ degrees. Alternatively, the first intermediate position may be set to a valve open side maximum opening degree (about +3.5 degrees) in the EGR gas leak quantity insensible range.

In the present embodiment, when the spring balance point is set to the full close point ($\theta=0$ degree) used in the control operation, the second intermediate position is set at the $\theta=-30$ degrees. Alternatively, the second intermediate position may be set to a valve close side maximum opening degree (about $-3.5$ degrees) in the EGR gas leak quantity insensible range.

Furthermore, the spring balance point may be set to the valve full close position, or the second intermediate position may be set to the valve full close position.

In the above embodiment, the EGRV opening and closing control operation (the deposit scraping action) is executed upon turning off the ignition switch. Alternatively, the EGRV opening and closing control operation (the deposit scraping action) may be executed after the stopping of the engine or at the time of engine start. Also, the deposit scraping action may be executed at the time of executing the full close movement of the butterfly valve 1 during the normal engine operation.

In the case where a full close movement execution condition for executing the full close movement of the butterfly valve 1 of the EGRV 110 is satisfied in the valve open state (e.g., the full valve open state) of the butterfly valve 1, the spring balance point (the neutral position) is initially set as the target EGR opening degree (the target opening degree), which is the control target value.

The full close movement execution condition may be satisfied, for example, when the driving state of the vehicle (e.g., the automobile) is changed, or when the operational state of the engine is excessively changed (e.g., when the driver presses the accelerator pedal deeply to implement the full opening degree of the accelerator, or when the supercharging of the intake air is executed by the turbo-charger in the high load range of the engine, or when the normal driving state is changed to the acceleration driving state by pressing of the accelerator pedal), or when the brake pedal is pressed by the driver.

Furthermore, at the time of executing the EGRV opening and closing control operation (the deposit scraping action), when the butterfly valve 1 is moved from the second intermediate position or the first intermediate position to the first intermediate position or the second intermediate position, the movement of the butterfly valve 1 may be stopped at the location immediately before the neutral position (the spring balance point) until predetermined time elapses. In such a case, the butterfly valve 1 can pass the neutral position at the low valve moving speed, which is set at the time of moving the butterfly valve 1 from the neutral position to the first intermediate position or to the second intermediate position.

In this way, it is possible to limit the generation of the hitting sound, which is caused by the collision between the tooth surfaces of the adjacent gears of the speed reducing mechanism at the time of executing the deposit scraping action.

In the above embodiment, the neutral position is set as the control target value at the time of moving the butterfly valve 1 from the first intermediate position side or the second intermediate position side. Alternatively, a position adjacent to the neutral position may be set as the control target value in place of the neutral position.

Additional advantages and modifications will readily occur to those skilled in the art. The invention in its broader terms is therefore not limited to the specific details, representative apparatus, and illustrative examples shown and described.

What is claimed is:

1. A valve opening and closing control apparatus comprising:
    a fluid control valve device that includes:
        a housing that forms a fluid passage communicated with a combustion chamber of an internal combustion engine; and
        a valve that is received in the fluid passage in an openable and closable manner;
    an actuator that includes:
        an electric motor that generates a drive force to drive the valve in a valve opening direction or a valve closing direction; and
        a plurality of gears that transmit the drive force of the electric motor to the valve;
    a first valve urging means for urging the valve in the valve closing direction;
    a second valve urging means for urging the valve in the valve opening direction;
    a valve position sensing means for sensing a current position of the valve; and
    a control unit that variably controls an electric power supplied to the electric motor in such a manner that a valve position, which is sensed with the valve position sensing means, coincides with a control target value of the valve, wherein:
    the control unit variably controls the electric power supplied to the electric motor in such a manner that the valve repeats an opening and closing movement within a predetermined valve opening degree range between a first intermediate position and a second intermediate position through a neutral position;
    the neutral position is located at or adjacent to a full close position, at which the valve is fully closed to close the fluid passage;
    an urging force of the first valve urging means is balanced with an urging force of the second valve urging means at the neutral position;
    the first intermediate position is displaced from the neutral position in the valve opening direction;
    the second intermediate position is displaced from the neutral position in the valve closing direction;
    when the control unit variably controls the electric power supplied to the electric motor to repeat the valve opening and closing movement of the valve, the control unit initially sets one of the neutral position and a position adjacent to the neutral position as the control target value until the valve position, which is sensed with the valve position sensing means, is located immediately before the one of the neutral position and the position adjacent to the neutral position; and
    the control unit thereafter changes the control target value to the first intermediate position or the second intermediate position when the control unit determines that the valve position, which is sensed with the valve position sensing means, reaches the one of the neutral position and the position adjacent to the neutral position.

2. The valve opening and closing control apparatus according to claim 1, wherein the control unit changes the control target value to the second intermediate position when the valve position, which is sensed with the valve position sensing means, reaches the one of the neutral position and the position adjacent to the neutral position at the time of variably controlling the electric power supplied to the electric motor to move the valve from the first intermediate position toward the second intermediate position through the neutral position.

3. The valve opening and closing control apparatus according to claim 1, wherein the control unit changes the control target value to the first intermediate position when the valve position, which is sensed with the valve position sensing means, reaches the one of the neutral position and the position adjacent to the neutral position at the time of variably controlling the electric power supplied to the electric motor to move the valve from the second intermediate position toward the first intermediate position through the neutral position.

4. The valve opening and closing control apparatus according to claim 1, wherein the control unit executes a deceleration control operation to progressively decelerate a moving speed of the valve toward the control target value when the valve position, which is sensed with the valve position sensing means, is located immediately before the control target value at the time of executing the opening and closing movement of the valve within the predetermined valve opening degree range.

5. The valve opening and closing control apparatus according to claim 1, wherein:
    the control unit variably controls the electric power supplied to the electric motor to reverse a moving direction of the valve when the valve position, which is sensed with the valve position sensing means, reaches the second intermediate position upon passing the neutral position at the time of executing the opening and closing movement of the valve within the predetermined valve opening degree range; and
    the control unit thereafter variably controls the electric power supplied to the electric motor to reverse the moving direction of the valve when the valve position, which is sensed with the valve position sensing means, reaches the first intermediate position upon passing the neutral position.

6. The valve opening and closing control apparatus according to claim 1, wherein:
    the first valve urging means is a first spring that applies a load in a direction of returning the valve at least from the first intermediate position toward the neutral position; and
    the second valve urging means is a second spring that applies a load in a direction of returning the valve at least from the second intermediate position toward the neutral position.

* * * * *